US010831931B2

(12) United States Patent
Gonzalez Sanchez et al.

(10) Patent No.: US 10,831,931 B2
(45) Date of Patent: Nov. 10, 2020

(54) METHOD AND SYSTEM FOR PRESERVING PRIVACY IN AN HTTP COMMUNICATION BETWEEN A CLIENT AND A SERVER

(71) Applicant: NEC Laboratories Europe GmbH, Heidelberg (DE)

(72) Inventors: Roberto Gonzalez Sanchez, Heidelberg (DE); Miriam Marciel, Getafe (ES); Lili Jiang, Umea (SE)

(73) Assignee: NEC LABORATORIES EUROPE GMBH, Heidelberg (DE)

(*) Notice: Subject to any disclaimer, the term of this patent is extended or adjusted under 35 U.S.C. 154(b) by 144 days.

(21) Appl. No.: 16/085,621

(22) PCT Filed: Mar. 31, 2016

(86) PCT No.: PCT/EP2016/057171
§ 371 (c)(1),
(2) Date: Sep. 17, 2018

(87) PCT Pub. No.: WO2017/167391
PCT Pub. Date: Oct. 5, 2017

(65) Prior Publication Data
US 2019/0130134 A1  May 2, 2019

(51) Int. Cl.
*G06F 21/62* (2013.01)
*H04L 29/06* (2006.01)

(52) U.S. Cl.
CPC ...... *G06F 21/6263* (2013.01); *H04L 63/0281* (2013.01); *H04L 63/0407* (2013.01); *H04L 63/0421* (2013.01); *H04L 63/168* (2013.01)

(58) Field of Classification Search
CPC ............ G06F 21/6263; H04L 63/168; H04L 63/0421; H04L 63/0281; H04L 63/0407
USPC ....................................................... 726/12
See application file for complete search history.

(56) References Cited

U.S. PATENT DOCUMENTS

| 6,851,060 | B1* | 2/2005 | Shrader | G06F 21/6263 726/10 |
| 7,925,694 | B2* | 4/2011 | Harris | H04L 67/2842 709/203 |
| 7,930,252 | B2* | 4/2011 | Bender | G06Q 20/383 705/74 |
| 8,166,406 | B1* | 4/2012 | Goldfeder | H04L 63/102 715/745 |
| 8,769,660 | B2* | 7/2014 | Agarwal | H04L 67/2842 726/12 |
| 9,060,031 | B1* | 6/2015 | Taylor | G06F 21/6254 |
| 9,104,778 | B2* | 8/2015 | Casteel | G06Q 30/0255 |
| 9,152,820 | B1* | 10/2015 | Pauley, Jr. | H04L 63/1408 |

(Continued)

FOREIGN PATENT DOCUMENTS

WO    WO 2012087954 A2    6/2012

*Primary Examiner* — David J Pearson
*Assistant Examiner* — Badri Champakesan
(74) *Attorney, Agent, or Firm* — Leydig, Voit & Mayer, Ltd.

(57) ABSTRACT

A method for preserving privacy in an HTTP communication between a client and a server includes: intercepting an HTTP request that is sent from the client to the server; extracting a cookie from the HTTP request, the cookie including a cookie name and a cookie value; splitting the cookie value into information segments; and modifying one or more of the information segments based on predefined modification rules.

13 Claims, 4 Drawing Sheets

(56) References Cited

U.S. PATENT DOCUMENTS

| | | | | |
|---|---|---|---|---|
| 2003/0018707 A1* | 1/2003 | Flocken | ............... | H04L 67/22 709/203 |
| 2008/0263627 A1* | 10/2008 | Berteau | ............... | H04L 63/102 726/1 |
| 2010/0107234 A1* | 4/2010 | Aldor | ............... | H04L 63/123 726/9 |
| 2010/0145960 A1* | 6/2010 | Casteel | ............... | G06F 16/9574 707/756 |
| 2012/0066142 A1* | 3/2012 | Jenkins | ............... | G06F 21/6227 705/326 |
| 2012/0137210 A1* | 5/2012 | Dillon | ............... | G06F 16/9574 715/234 |
| 2014/0181314 A1* | 6/2014 | Barzilai | ............... | H04L 67/2823 709/227 |
| 2014/0230059 A1* | 8/2014 | Wang | ............... | H04L 63/1416 726/23 |
| 2015/0046579 A1* | 2/2015 | Perez | ............... | G06F 16/23 709/224 |
| 2017/0142158 A1* | 5/2017 | Laoutaris | ............... | H04L 67/02 |

* cited by examiner (1)::253024271.14531226666.239.16.utmcsr=host.com/search/|utmccn=(10.0.0.5)|utmcmd=organic| utmctr=ail@host.com }

(2):: 253024271.14531226666.239.16.utmcsr={URL}|utmccn=({IP})|utmcmd=organic|utmctr={EMAIL}

(3)::{NUM}.{TS}.{NUM}.{NUM}.{TEXT}={URL}{TEXT}=({IP}){TEXT}={TEXT}{TEXT}={EMAIL}

Fig. 3 domain:: host.netcook name:: _utmz

_utmz= {NUM}.{TS}.{NUM}.{NUM}.{TEXT}={URL} | {TEXT}={IP}

_utmz= {NUM}.{TS}.{NUM}.{NUM}.{TEXT}={URL} | {TEXT}={IP} | {TEXT}={TEXT}

_utmz= {NUM}.{TS}.{NUM}.{NUM}.{TEXT}={URL} | {TEXT}={IP} | {TEXT}={TEXT} | {TEXT}={EMAIL}

_utmz= {NUM}.{TS}.{NUM}.{NUM}.{TEXT}={URL} | {TEXT}={IP} | {TEXT}={TEXT} | {TEXT}={EMAIL}

Fig. 4

METHOD AND SYSTEM FOR PRESERVING PRIVACY IN AN HTTP COMMUNICATION BETWEEN A CLIENT AND A SERVER

STATEMENT REGARDING GOVERNMENT SPONSORED RESEARCH

The work leading to this invention has received funding from the European Union's Horizon 2020 Programme under grant agreement n° 653449.

CROSS-REFERENCE TO PRIOR APPLICATIONS

This application is a U.S. National Stage Application under 35 U.S.C. § 371 of International Application No. PCT/EP2016/057171 filed on Mar. 31, 2016. The International Application was published in English on Oct. 5, 2017, as WO 2017/167391 A1 under PCT Article 21(2).

FIELD

The present invention relates to a method and system for preserving privacy in an HTTP (Hypertext Transfer Protocol) communication between a client and a server.

BACKGROUND

The Hypertext Transfer Protocol (HTTP) is designed to provide communications between clients and servers. HTTP operates as a request-response protocol between a client and server. A web browser may be the client and an application on a computer that hosts a web site may be the server. For instance a browser as client sends an HTTP request to the server. Thereupon, the server returns a response to the client. The response can include status information about the request and may also contain the requested content.

Furthermore, the Interactive Advertisement Bureau (IAB) reported that online advertising generated revenue of $49 B in 2014, in the U.S. alone. This figure corresponds to a 15.6% increase in revenue with respect to 2013. To this end, it is referred to The Interactive Advertising Bureau (IAB), "IAB internet advertising revenue report, 2014 full year results" retrievable at http://www.iab.net/media/file/IAB_Internet_Advertising_Revenue_Report_FY_2014.pdf. This impressive size and growth allows online advertising to support some of the most important Internet services such as search, social media and user generated content sites, which are at the forefront of innovation in the Internet, and have generated more than 3.4 million direct and indirect jobs in Europe in 2012 alone.

A great advantage of online advertising over traditional printed and TV advertising is its capability to target individuals with specialized advertisements tailored to their specific interests. To collect the necessary information for implementing targeted advertising, different tracking techniques have been developed in the last years to profile a given user and identify his/her interests, e.g., based on the browsing history of the user. The lack of transparency regarding tracking techniques and the type of information that companies collect about users are creating an increasing amount of concern in the society (e.g., privacy lawyers, regulators, advertisers, mainstream media, Internet end-users, etc.). Furthermore, this has prompted the formation of several initiatives (e.g., W3C's Do-Not-Track, Mozilla's Cookie Clearing House, etc.) for advocating in favor of end users' privacy.

Existing strategies to preserve privacy against these tracking mechanisms are based in Block All policies, destroying the advertising market and the freemium ecosystem built around it. Nowadays, several other solutions may be found which are able to safeguard in different ways the privacy of the users. The most widely used is AdBlockPlus (https://adblockplus.org/), an application that blocks all the content coming from servers/hosts appearing in a list of rules. More sophisticated tools such as Ghostery retrievable at https://www.ghostery.com, TorBrowser retrievable at https://www-.torproject.org and NoScript retrievable at http://noscript.net are also available. Nevertheless, these tools usually affect the user experience making sometimes impossible to access the content of the legitimate web pages, and in any case they block the online ads, killing that way the freemium ecosystem funded by them.

In the context mentioned above, tracking cookies are used as the way of tracking users online by adding unique identifiers in the users' HTTP cookies and several methods have been designed to detect this user identifier information in cookies. To this end, it is referred to the non-patent literature of H. Metwalley, S. Traverso and M. Marco: "Unsupervised detection of web trackers" in Proceedings of IEEE GLOBECOM, 2015 and to the non-patent literature of Fotios Papaodyssefs, Costas Iordanou, Jeremy Blackburn, Nikolaos Laoutaris and Konstantina Papagiannaki: "Web Identity Translator: Behavioral Advertising and Identity Privacy with WIT", in Proceedings of the 14th ACM Workshop on Hot Topics in Networks (HotNets-XIV), 2015.

Detecting these user identifiers by analyzing cookies helps to analyze data about web page traffic and improve various applications to tailor it to customer needs. Nevertheless, the proposed methods so far are too naive because they consider each HTTP cookie as a single portion of information while it is a common habit from the web publisher and especially the web trackers to encapsulate several different pieces of information inside the main cookie value, making most of the existing methods fail. Moreover, the way in which the different pieces of information are encapsulated usually follows a proprietary format that may be different for each web page, making it impossible to identify the different parts.

For instance, the cookie_utma is widely used by google analytics to gather statistics about the web usage of different users. This cookie packs different variables inside its cookie value. In particular, it includes an identifier of the web page, an identifier of the user and three timestamps that correspond to the first, previous and current visit to the web page. With this format, it is impossible for methods like the one described in the non-patent literature of H. Metwalley, S. Traverso and M. Marco: "Unsupervised detection of web trackers" in Proceedings of IEEE GLOBECOM, 2015 to detect the unique identifier, since the presence of the timestamps make the value of the cookie changes continuously.

Furthermore, without knowing the format that is used, the method described in the non-patent literature of Fotios Papaodyssefs, Costas Iordanou, Jeremy Blackburn, Nikolaos Laoutaris and Konstantina Papagiannaki: "Web Identity Translator: Behavioral Advertising and Identity Privacy with WIT", in Proceedings of the 14th ACM Workshop on Hot Topics in Networks (HotNets-XIV), 2015 will struggle to correctly mix different user profiles.

SUMMARY

In an embodiment, a method for preserving privacy in an HTTP communication between a client and a server is provided that includes: intercepting an HTTP request that is sent from the client to the server; extracting a cookie from the HTTP request, the cookie including a cookie name and a cookie value; splitting the cookie value into information segments; and modifying one or more of the information segments based on predefined modification rules.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 is an example for illustrating a procedure of entity extraction for a method or a system according to an embodiment of the present invention, wherein the entity extraction is applied to a cookie value, and FIG. 4 is an example for illustrating a procedure of split pattern generation for a method or a system according to an embodiment of the present invention.

DETAILED DESCRIPTION

Figure 1:
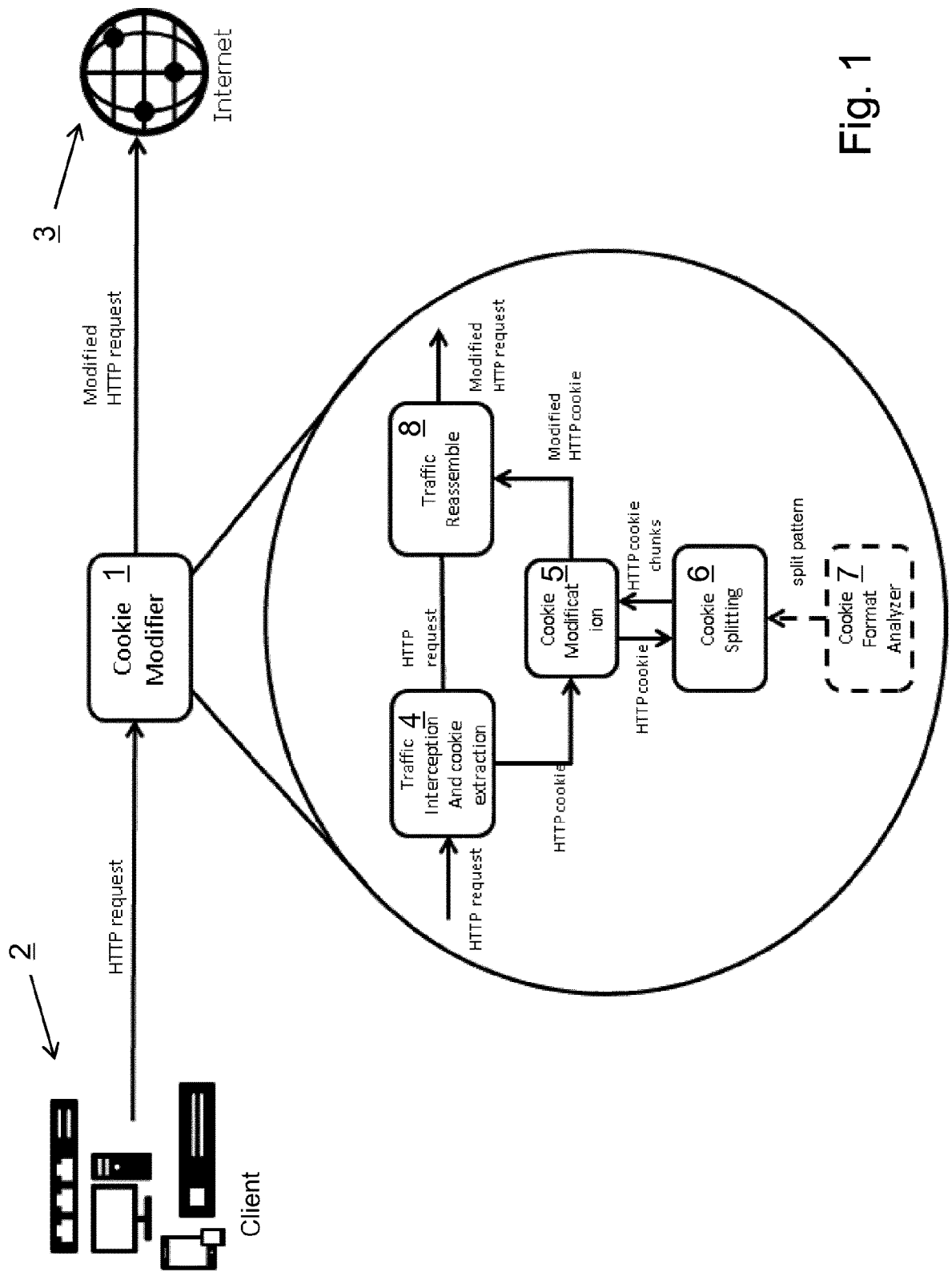
FIG. 1 is a schematic view of an application scenario of an embodiment of a method or a system according to the present invention illustrating a use of a cookie modifier module.

Embodiments of the present invention improve and further develop a method and a system for preserving privacy in an HTTP communication between a client and a server, in particular with regard to security and accuracy.

In an embodiment, a method for preserving privacy in an HTTP communication between a client and a server is provided, the method including:

intercepting an HTTP request that is sent from the client to the server;

extracting a cookie from the HTTP request, the cookie including a cookie name and a cookie value;

splitting the cookie value into information segments; and modifying one or more of the information segments based on predefined modification rules.

Furthermore, an embodiment provides a system for preserving privacy in an HTTP communication between a client and a server, the system including a cookie modifier module. The cookie modifier module is configured:

to intercept an HTTP request that is sent from the client to the server, to extract from the HTTP request a cookie including a cookie name and a cookie value, to split the cookie value into information segments, and to modify one or more of the information segments based on predefined modification rules.

According to the invention it has first been recognized that in the context of user tracking an enormous improvement can be provided by identifying and/or modifying parts of cookie values instead of treating the whole cookie value as a unique string. Specifically, an HTTP (Hypertext Transfer Protocol) request that is sent from a client to a server is intercepted and a cookie included by the HTTP request is extracted, wherein the cookie includes a cookie name and a cookie value. The cookie value is split into information segments and, then, one or more of the information segments are modified based on predefined modification rules. Thus, according to the invention, it is possible to selectively block or modify parts of the HTTP cookies.

Furthermore, it has been recognized that treating the cookie as single variable decreases the probability of accurately identifying the unique user ids sent within the cookies, as well as detecting potential privacy leakages. Thus, in contrast to state of the art solutions which treat the cookie values as a single variable, a method or a system according to embodiments of the present invention is more flexible and efficient in controlling over the information that is transferred within the HTTP communication between the client and the server, in particular with regard to the information that is transferred within the HTTP cookies of a user.

Hence, embodiments of the present invention enable the modification and/or analysis of the pieces of information transferred inside a single cookie value to improve the data quality and increase the accuracy of subsequent actions. In particular, the present invention may enable the practical function of preventing the tracking information contained inside the HTTP cookies, e.g. a unique user id, from leaking, without blocking any advertisements. However, other important information contained inside the cookies may be kept, for example the user language.

Therefore, a method and a system according to the present invention provides an improvement with regard to security and accuracy for a user compared with known prior art approaches. In particular, the present invention provides a fine-grained privacy preserving mechanism that may be deployed in a network equipment.

According to embodiments of the invention the intercepting, the extracting, the splitting and the modifying may be performed by a cookie modifier module (also called a cookie modifier). Advantageously, the cookie modifier module may be interposed and/or located between the client and the server. Thus, the HTTP traffic of a user or rather the HTTP traffic from the client can be easily intercepted.

According to embodiments of the invention the cookie modifier module may be implemented remotely from the client, in particular as a network proxy. Thus, the implementation of the cookie modifier module may be maintained centrally and beneficially.

According to embodiments of the invention, the cookie modifier module may be implemented locally in the client, in particular as a part of a local firewall or as a browser plugin. Thus, the HTTP traffic may be easily intercepted. Furthermore, if the cookie modifier is implemented as a browser plugin, the browser would also be able to intercept and modify HTTPS (HyperText Transfer Protocol Secure) traffic in an advantageous way.

According to embodiments of the invention deep packet inspection may be performed over the user's traffic between the client and the server in order to intercept the HTTP request and in order to extract the cookie from the HTTP request. Thus, cookie information including, e.g., server, cookie name and cookie value may be obtained. If the enforcement is local, the HTTP message may be directly received and analyzed. If the enforcement is remote, a traffic interception and cookie extracting module may need to intercept the communications to the port 80, reconstruct the TCP flow, or even break the TCP connection in order to get the whole HTTP requests. This step can be done with state of the art techniques such as mitmproxy retrievable at https://mitmproxy.org/.

According to embodiments of the invention, the splitting may be performed based on a split pattern for the cookie value such that the information segments and their data formats are identifiable. To this extent, the split pattern may represent a list of data formats that are included by the cookie value. Thus, the cookie value can be efficiently and easily split.

According to embodiments of the invention, the split pattern for the cookie value may be selected based on the cookie name and/or the server that is associated with the cookie. Thus, an appropriate split pattern may be easily chosen for splitting a cookie value of a predetermined cookie from a predetermined server/host.

According to embodiments of the invention, the split pattern for the cookie value may be received from a cookie format analyzer module (also called a cookie format analyzer) that provides for a predetermined cookie name an appropriate split pattern. Advantageously, there is for each available cookie name a suitable split pattern that accurately splits the corresponding cookie value into information segments.

According to embodiments of the invention, it may be provided that the cookie format analyzer module intercepts network traffic such as HTTP requests and extracts a plurality of cookies from one or more servers, in particular by the use of deep packet inspection. Thus, based on the analysis of several cookies from a plurality of HTTP requests a wide range of split patterns for diverse cookies may be obtained.

According to embodiments of the invention, it may be provided that a crowdsourcing system is employed for the cookie format analyzer module in order to collect cookies inside browsers of users. Thus, the cookie format analyzer might also be able to analyze HTTPS cookies.

According to embodiments of the invention, the cookie format analyzer module may perform entity extraction in order to determine data formats that are existent inside the cookie values of cookies that are extracted from different HTTP requests. Thus, a list of data formats can be generated for a predetermined cookie name.

According to embodiments of the invention, the entity extraction may be performed by iteratively checking predetermined entities within the cookie value of the cookies in order to generate a list of data formats for a predetermined cookie name. Thus, the data formats that are existent inside a cookie value may be indentified in an automatic way, namely using entity extraction methods, data analysis and/or big data processing techniques such as Apache Hadoop.

According to embodiments of the invention, the data formats may include IP address, email address, URL, timestamp, hexadecimal value, number, letter and/or alphanumeric text. Thus, the entities within the cookie value may be analyzed and detected efficiently and in a reliable way.

According to embodiments of the invention, multiple lists of data formats may be generated for a cookie name, for example by the cookie format analyzer module, where, in particular based on similarity and frequency features, one of the lists is selected as the split pattern that is employed for splitting the corresponding cookie value. Thus, based on a comparison of different data formats of entities that are obtained, an appropriate split pattern that is more likely to be used in each cookie value of a predetermined cookie name can be determined.

According to embodiments of the invention, iterative cookie decoding may be performed for converting encoded cookie values to their original strings. This step may be especially advantageous since some of the Web publishers encode the cookie values using well known techniques such as base64 or urlEncode to be able to send non-asci characters inside the HTTP cookie header. In this case, without decoding it might be impossible to recognize lots of valuable information to be further processed in following steps.

According to embodiments of the invention, the modification rules may be defined automatically and/or manually by a user. Thus, modification rules may be set in a flexible way and individually for a user.

According to embodiments of the invention, a system for preserving privacy in an HTTP communication between a client and a server may be provided, the system including:

a cookie modifier module, wherein the cookie modifier module is configured:
  to intercept an HTTP request that is sent from the client to the server,
  to extract from the HTTP request a cookie including a cookie name and a cookie value,
  to split the cookie value into information segments, and
  to modify one or more of the information segments based on predefined modification rules; and a cookie format analyzer module, wherein the cookie format analyzer module is configured to provide the cookie modifier module with a split pattern for splitting the cookie value into information segments.

Embodiments of the present invention may provide an online system as fine-grain Cookie Modifier that is able to modify/block one or more parts of a HTTP cookie value, e.g. for preserving user privacy without blocking advertisement information. The system can be supported by an HTTP cookie format analyzer module which recognizes user's information with higher accuracy by analyzing the cookie values for splitting them into information segments. Thus, embodiments of the present invention can provide a better accuracy than existing methods which simply consider each HTTP cookie value as a single text.

The present invention and/or embodiments may be advantageously employed in the context of ad blocking, online identity detection and/or privacy preservation.

An embodiment of the present invention may be able to selectively block and/or modify parts of HTTP cookies by the following steps:
  intercepting the HTTP traffic of the user,
  identifying the format used for the trackers to send the information inside the cookies, and
  blocking and/or modifying the desired part of the aforementioned cookie.

An embodiment of the present invention may be designed to allow a fine-grain control over the information transferred within the HTTP cookies of a user. By doing this, an online interception and modification system may be used, where this system may be supported by an analyzer system that is able to identify the data format used inside the HTTP cookies. Thus, according to an embodiment, the system may include two subsystems that communicate among each other:

Cookie modifier: A subsystem that is able to intercept HTTP traffic, extract the HTTP cookies and enforce some blocking or modification rules in a part of one or more HTTP cookies. The modification rules can be automatically defined or chosen by the user.

Cookie format analyzer: A subsystem that is able to identify the format used to encapsulate different pieces of information inside each cookie. This phase could be carried out either online or offline to generate a list of formats that allows the correct parsing of the HTTP cookies using entity recognition and data analysis techniques.

There are several ways how to design and further develop the teaching of the present invention in an advantageous way. To this end it is to be referred to the patent claims on the one hand and to the following explanation of further embodiments of the invention by way of example, illustrated by the figure on the other hand. In connection with the explanation of the further embodiments of the invention by the aid of the figures, generally further embodiments and further developments of the teaching will be explained.

FIG. 1 shows an application scenario of an embodiment of a method or a system according to the present invention, wherein the use of a Cookie Modifier module 1 is illustrated. Specifically, the Cookie Modifier module 1 as illustrated in FIG. 1 includes several components that enable a correct modification of the data packets that are sent from a client 2 to a server in the internet 3.

The Cookie Modifier module 1 of FIG. 1 is a subsystem that can be remotely implemented as a network proxy able to intercept the HTTP (Hypertext Transfer Protocol) traffic or local, as part of the local firewall or as a browser plugin. In the second case, the browser would also be able to intercept and modify the HTTPS (Hypertext Transfer Protocol Secure) traffic.

The Cookie modifier module 1 includes a Traffic Interception and Cookie Extraction component 4 that is in charge of capturing and analyzing the traffic sent over the network, in particular a HTTP request. The Traffic Interception and Cookie Extraction component 4 performs Deep Packet Inspection over the user's traffic and extracts cookie information. If the enforcement point is local, the Traffic Interception and Cookie Extraction component 4 can directly receive the HTTP message and analyze it. If the enforcement is remote, the Traffic Interception and Cookie Extraction component 4 of the Cookie Modifier module 1 may need to intercept the communications to the port 80, reconstruct the TCP flow, or even break the TCP connection in order to get the whole HTTP requests. This step can be done with state of the art techniques such as mitmproxy retrievable at https://mitmproxy.org/. The cookie information is saved then as a triplet composed by:

Cookie_Info→{Server,Cookie Name,Cookie Value}

Once the cookie information is obtained, it is passed to a Cookie Modification component. The Cookie Modification component 5 will be in charge of interpreting the rules imposed by a final user or by preconfigured lists and applying them. In order to allow the fine-grain modification, the Cookie Modification component 5 needs to split the cookie value using a Cookie Splitting component 6. The Cookie Splitting component 6 uses a list of data formats, i.e. a split pattern generated by a Cookie Format Analyzer module 7 to split the cookies, and return a group of cookie chunks together with information of each chunk nature.

Finally, when the cookie value of the cookie has been modified, the cookie is passed together with the original traffic to a Traffic Reassemble component 8. The Traffic Reassemble component 8 substitutes the original cookie for the new one. In case of local enforcement, the Traffic Reassemble component 8 can directly send the packet after this step. In the case of network enforcement, the Traffic Reassemble component 8 needs to reconstruct the TCP packet or packets before forwarding them to the next step.

Figure 2:
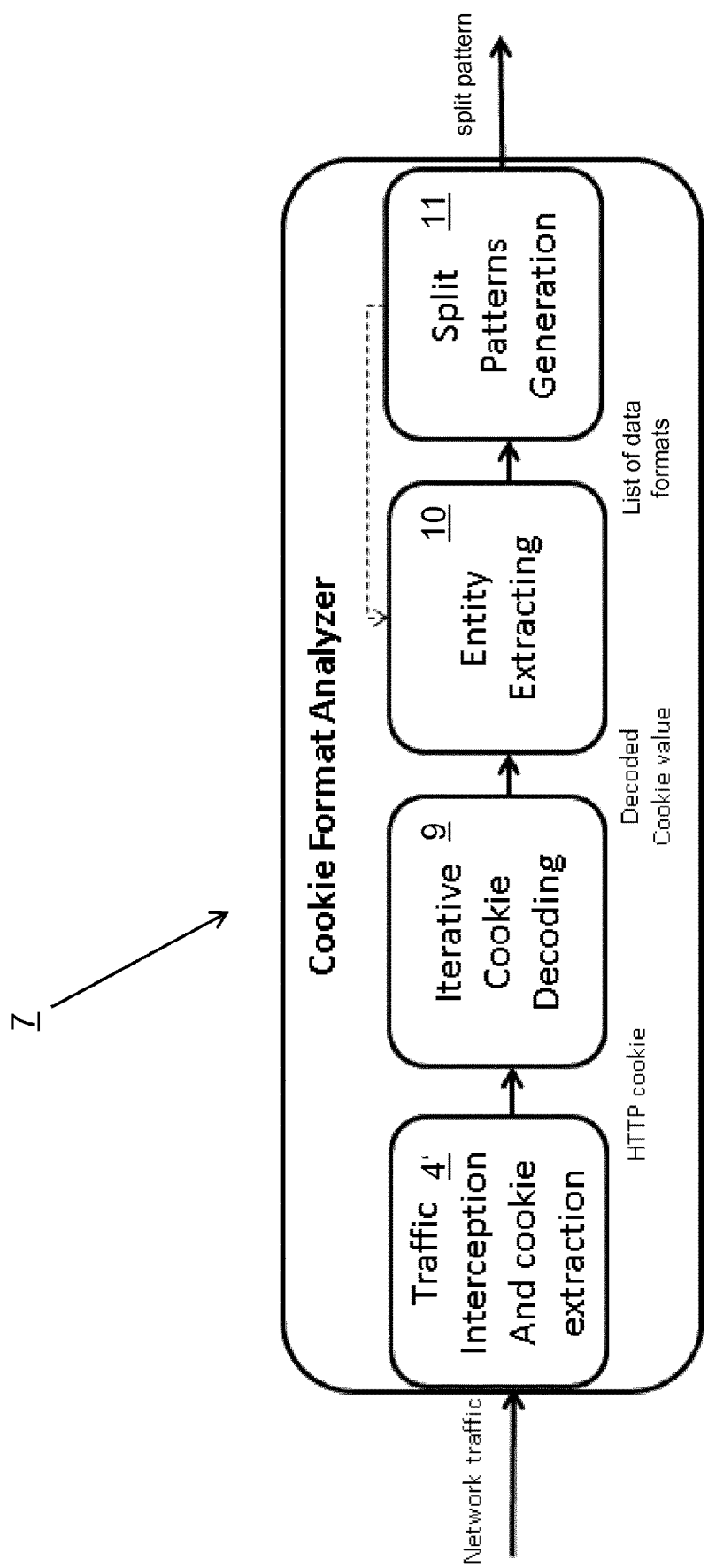
FIG. 2 is a schematic view illustrating an example of a design of a cookie format analyzer module for a method or a system according to an embodiment of the present invention.

FIG. 2 shows an example of a design of a Cookie Format Analyzer module 7 for a method or a system according to an embodiment of the present invention. The Cookie Format Analyzer module 7 is a subsystem, in particular an offline subsystem, that is able to parse the data format existent inside the HTTP cookies. Instead of representing the cookies in a HTTP request as a single portion of information the Cookie Format Analyzer module 7 aims to analyze and split the cookies in each HTTP request. The Cookie Format Analyzer module 7 of FIG. 2 parses a batch of HTTP requests, decodes the encoded cookies, extracts entities such as IP address, email, URL, etc., inside the cookie, analyzes the different cookie structures using probability statistic theory, and finally generates cookie split patterns using a tree-pattern based approach using literature like C. K.-S. Leung, M. A. F. Mateo, D. A. Brajczuk. "A Tree-Based Approach for Frequent Pattern Mining from Uncertain Data", in Proc. PAKDD 2008 or Jiawei Han, Jian Pei, Yiwen Yin, Runying Mao, "Mining Frequent Patterns without Candidate Generation: A Frequent-Pattern Tree Approach", in Data Mining and Knowledge Discovery, v. 8 n. 1, p. 53-87, January 2004.

The Cookie Format Analyzer module 7 of FIG. 2 can analyze the traffic of a large number of users in order to obtain the correct patterns, i.e. the data formats within a cookie value, in a periodic way. After the analysis is done by the Cookie Format Analyzer module 7, the Cookie Format Analyzer module 7 pushes a list of data format as split pattern for a predetermined cookie to the Cookie Modifier module.

The Cookie Format Analyzer module 7 may be performed in a network system/equipment observing the traffic of a large number of users in real time. The Cookie Format Analyzer 7 of FIG. 2 may support both online and offline cookie format analysis. The Cookie Format Analyzer module 7 includes a Traffic Interception and Cookie Extraction component 4' for capturing the HTTP traffic and extracting the cookies in a similar way as the Cookie Modifier module 1 of FIG. 1. The same triplets of cookie information are generated, namely:

Cookie_Info→{Server,Cookie Name,Cookie Value}

Then, a Iterative Cookie Decoding component 9 is applied to check whether a cookie value is encoded. If encoded, the Iterative Cookie Decoding component 9 iteratively decodes each given cookie value to its original string. For example, the cookie value "raHR0cDovL3d3dy5mYXBleC5lcy9zZWFyY2gvP0VY UFM9QkMrUTEwK1RpbWU" is decoded twice and finally converted to "http://www.fapex.es/search/EXPS=BC+Q10+ Time". This step can be fundamental since some of the Web publishers encode the cookie values using well known techniques such as base64 or urlEncode to be able to send non-asci characters inside the HTTP cookie header. In this case, without decoding it would be impossible to recognize lots of valuable information to be further processed in following steps.

Furthermore, the Cookie Format Analyzer module 7 of FIG. 2 includes an Entity Extracting component 10. The Entity Extracting component 10 is able to extract the tentative format used inside a cookie value. To this end, the Entity Extracting component 10 uses regular expressions to identify parts of the cookie value that are special entities. The list of entity data formats to be checked according to an embodiment of the present invention may include, but is not limited to, IP addresses, email address, URLs, timestamps, hexadecimal values, numbers, letters and/or alphanumeric text.

For each cookie value, the entity extraction performed by the Entity Extracting component 10 iteratively searches for a specific entity data format, starting from the most specific and finishing with the most general one. In each entity extraction phase the system substitutes the identified entities with a symbol indicating its entity data format.

FIG. 3 shows an example for illustrating the procedure of entity extraction for a method or a system according to an embodiment of the present invention, wherein the entity extraction is applied to a cookie value. The procedure of entity extraction as shown in the example of FIG. 3:

String (1) illustrated in FIG. 3 is a given cookie value of some web server as input of the Entity Extracting component. The Entity Extracting component starts checking from the most specific entity, in this case a URL, email, and IP address, which results in a string (2). After that, Entity Extracting component considers other entities including number (NUM), timestamp (TS), text (TEXT) resulting in string (3) as output of the Entity Extracting component.

The Entity Extracting component 10 is beneficial in order to know the structure inside the cookie value of a corresponding cookie name (e.g., whether it is made up of IP address, timestamp, email, URL, or a sequence of numbers, etc.), which may be used in a wide range of applications including user identification recognition. The Entity Extracting component 10 is also beneficial in order to improve efficiency, through filtering out cookies from splitting, if its cookie value is constituted of a single entity, e.g., dz="35792".

All resulting data formats for each request like the string (3) of FIG. 3 are then stored in a database. As soon as sufficient data have been stored to meet statistic requirements, e.g. at least 50 different requests for a domain, a Split Pattern Generation component of the Cookie Format Analyzer module of FIG. 2 is triggered to generate split patterns for all cookies from each specific server/host and split each cookie value into piece of element information, i.e. into information segments. The goal of the Split Pattern Generation component 11 is to determine how to split the cookie values.

The example of FIG. 4 illustrates a process of generating a pattern to split the cookie value of a cookie name regarding a specific domain. As shown in the example of FIG. 4, given a cookie name '_utmz' from a specific domain, there are a list of its cookie values, each of which denotes the cookie value from a different HTTP request. All of them have been parsed as a string of symbols indicating its structure by the Entity Extracting component 10. A cookie value could be split in different ways. Therefore, a frequency of different special characters between entities in the data formats output from Entity Extracting component 10 is calculated, wherein special characters frequently occurring in the cookie value are selected as split pattern candidates. Following generating a list of split patterns according to the different orders of these special characters, the pattern similarity between different splitting segments under different split patterns is calculated. Based on the features of frequency and similarity, all the split patterns are ranked and finally the top ranked one is chosen as split pattern for this given cookie name. As shown in FIG. 2, the Entity Extracting component 10 can receive feedback from the Split Pattern Generation module 11. This feedback can be used by the Entity Extracting module 10 to improve the accuracy of the results.

After calculation and analysis of the Cookie Format Analyzer component 7, the following information may be got as output for the cookie "_utmz" of FIG. 4:

The cookie value of the cookie_utmz consists of a varied number of elements split by dot (.), containing numbers, timestamps, and a list of assignments as the last element. The last element could be split with vertical_bar (|) resulting in the format of "attribute_name=attribute_value" and especially the data format of the attribute value is recognizable, respectively including URL, IP, text, or email.

As shown in FIG. 1, the cookie split pattern from the Cookie Format Analyzer module significantly serves the online Cookie Modifier module 1. The Cookie Modifier module 1 may be further used for a wide range of applications such as advertisement and privacy preservation. For example, 'TEXT=URL' may denote the previous visited website of a user from a specified IP, parsed from 'TEXT=IP'.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for preserving privacy in an HTTP communication between a client and a server, the method comprising:
    intercepting an HTTP request that is sent from the client to the server;
    extracting a cookie from the HTTP request, wherein the cookie includes a cookie name and a cookie value;
    splitting the cookie value into information segments according to a split pattern; and
    modifying one or more of the information segments based on predefined modification rules,
    wherein the split pattern for the cookie value is received from a cookie format analyzer, the cookie format analyzer selecting the split pattern by:

generating multiple lists of data formats based on the cookie name, and selecting one of the lists as the split pattern based on similarity and frequency features associated with the data formats, wherein the splitting is performed based on a split pattern for the cookie value such that the information segments and their data formats are identifiable.

2. The method according to claim 1, wherein the intercepting, the extracting, the splitting and the modifying are performed by a cookie modifier.

3. The method according to claim 2, wherein the cookie modifier is implemented remotely from the client as a network proxy.

4. The method according to claim 2, wherein the cookie modifier is implemented locally in the client as a part of a local firewall or as a browser plugin.

5. The method according to claim 1, wherein deep packet inspection is performed in order to intercept the HTTP request and in order to extract the cookie from the HTTP request.

6. The method according to claim 1, wherein the split pattern for the cookie value is selected based on the cookie name and/or the server that is associated with the cookie.

7. The method according to claim 1, wherein the cookie format analyzer intercepts network traffic and extracts a plurality of cookies from one or more servers.

8. The method according to claim 1, wherein the cookie format analyzer performs entity extraction in order to determine data formats within the cookie value.

9. The method according to claim 8, wherein the entity extraction is performed by iteratively checking predetermined entities within the cookie value of the cookies in order to generate the multiple list of data formats for the cookie name.

10. The method according to claim 1, wherein iterative cookie decoding is performed for converting the information segments of the cookie value to their original strings.

11. The method according to claim 1, wherein the modification rules are defined automatically and/or manually by a user.

12. A non-transitory processor readable medium storing processor executable instructions, which when executed by a processor execute a method for preserving privacy in an HTTP communication between a client and a server, the method comprising instantiating a cookie modifier, wherein the cookie modifier is configured:

to intercept an HTTP request that is sent from the client to the server;

to extract from the HTTP request a cookie including a cookie name and a cookie value;

to split the cookie value into information segments according to a split pattern; and to modify one or more of the information segments based on predefined modification rules, wherein the split pattern for the cookie value is received from a cookie format analyzer, the cookie format analyzer selecting the split pattern by:

generating multiple lists of data formats based on the cookie name, and selecting one of the lists as the split pattern based on similarity and frequency features associated with the data formats, wherein the splitting is performed based on a split pattern for the cookie value such that the information segments and their data formats are identifiable.

13. The method according to claim 7, wherein the cookie format analyzer uses deep packet inspection.

* * * * *